United States Patent
Bishop et al.

(10) Patent No.: US 6,548,705 B1
(45) Date of Patent: Apr. 15, 2003

(54) COMPOUND COMPATIBLE WITH INORGANIC SOLIDS, AND WITH HOMOPOLYMERS AND COPOLYMERS OF PROPYLENE AND OF ETHYLENE

(75) Inventors: C. Edward Bishop; Suhas G. Niyogi, both of Hockessin, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/596,091

(22) Filed: Jun. 16, 2000

(51) Int. Cl.[7] ..................... C07C 211/08; C07C 19/075
(52) U.S. Cl. ................. 564/463; 570/101; 570/181
(58) Field of Search .................. 564/463; 570/101, 570/181

(56) References Cited

U.S. PATENT DOCUMENTS

| | | |
|---|---|---|
| 4,187,210 A | 2/1980 | Howard, Jr. |
| 4,310,547 A | 1/1982 | Hunt et al. |
| 4,510,331 A | 4/1985 | Yoshimura et al. |
| 5,143,549 A | 9/1992 | Howard, Jr. |
| 5,552,469 A | 9/1996 | Beall et al. |
| 5,554,671 A | 9/1996 | Craun et al. |
| 5,739,397 A | 4/1998 | Adkins et al. |
| 5,760,121 A | 6/1998 | Beall et al. |
| 5,840,796 A | 11/1998 | Badesha et al. |
| 5,853,886 A | 12/1998 | Pinnavaia et al. |
| 5,880,197 A | 3/1999 | Beall et al. |
| 5,910,523 A | 6/1999 | Hudson |

FOREIGN PATENT DOCUMENTS

| | | |
|---|---|---|
| DE | 3145455 | 5/1983 |
| EP | 0541037 | 5/1993 |
| JP | 60067425 | 4/1985 |
| WO | 9743274 | 11/1997 |
| WO | 9920722 | 4/1999 |

OTHER PUBLICATIONS

Database Caplus on STN, Acc. No. 163:415473, Mayer et al., Helv. Chim. Acta (1963), 45(2), pp. 650–71 (abstract).*
Database Caplus on STN, Acc. No. 1965:445682, Kates et al., Biochemistry (1965), 4(8), pp. 1595–9 (abstract).*
Database Caplus on STN, Acc. No. 1966:439861, Sen Gupta et al., Fette, Seifen, Anstrichmittel (1966), 68(5), pp. 349–60.*
Database Caplus on STN, Acc. No. 1968: 10386, Kates et al., [Absolute stereochemical configuration of phytanyl (dihydrophytyl) groups in lipids on Halobacterium cutirubrum.] Biochemistry (1967), 6(11), pp. 3329–3338 (abstract).*
Database Caplus on STN, Acc. No. 1969: 11023, Joo et al., [Characterization and synthesis of mono– and diphytanyl ethers of glycerol.] J. Lipid Res. (1968), 9(6), pp. 782–788 (abstract).*
Database Caplus on STN, Acc. No. 1970:455294. Wolff et al., [Utility of dicyanomethylene derivatives in structrual studies of long–chain aliphatic acids by mass spectrometry.] Tetrahedron Lett. (1970), 31, PP. 2719–2722 (abstract).*
Database Caplus on STN, Acc. No. 1982:476144, Mackenzie et al., [The effect of maturation on the configuration of acyclic isoprenoid acids in sediments.] Geochim. Cosmochim. Acta (1882), 46(5), pp. 783–792 (abstract).*
Database Caplus on STN, Acc. No. 1988:474756, Taguchi et al., [Synthetic lipids forming bilayer films.] JP 62298561 A2 (abstract), 1988.*
N. Nagahama et al., Chem. Parm. Bull. 19(4): 660–6 (1971).
Y. Ando et al., J. Am. Oil Chem. Soc., 69(5): 417–24 (1992).
J. Cason et al., Tetrahedron, vol. 7: 189–298 (1959).
C. Mancuso, et al., J. Lipid Res., 26(9): 1120–5 (1985).
A. K. Sen Gupta et al., Industrieverlag Von Hernhaussen KG, vol. 68(5): 349–360 (1966).
Usuki et al., J. Appl. Poly, Sci, vol. 63, 137–139 (1997).
Kurokawa et al., J. Mat. Sci. Letters, 15 (1996), 1481–1483.

* cited by examiner

*Primary Examiner*—Johann Richter
*Assistant Examiner*—Brian J. Davis

(57) ABSTRACT

Disclosed is a compound comprising a saturated oligomer of isoprene bonded to a polar group, said compound having formula (I):

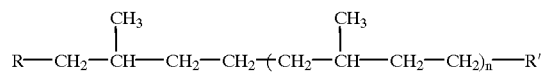

in which R is H or a $C_1$–$C_4$ alkyl, n is 2–17, and R' is a radical selected from the group consisting of X, COOR", CN, $NR_2$, and $NR_2.HX$, wherein R" is selected from the group consisting of R, $NR_2$, and $NR_2.HX$ or a monovalent metal cation, X being I, Cl, Br or F, and each R in $NR_2$ and $NR_2.HX$ being the same or different. In a preferred embodiment the polar group is a quaternary ammonium radical. The compound is useful as a compatibilizer of solid inorganic material, and propylene and ethylene polymer material.

1 Claim, No Drawings

COMPOUND COMPATIBLE WITH INORGANIC SOLIDS, AND WITH HOMOPOLYMERS AND COPOLYMERS OF PROPYLENE AND OF ETHYLENE

FIELD OF THE INVENTION

The invention is in the chemical arts. It relates to organic chemistry and, more particularly, to organic compounds.

BRIEF SUMMARY OF THE INVENTION

The invention comprises an organic compound having a nonpolar portion bonded to a polar portion.

The nonpolar portion for the most part is a saturated oligomer of isoprene. It resembles or mimics the basic structure or parts of the basic structure of the hydrocarbon backbone of homopolymers and copolymers of propylene and ethylene. This portion, therefore, tends to be compatible with α-olefin polymer material. selected from the group consisting of homopolymers of propylene, homopolymers of ethylene, and copolymers of propylene and ethylene with or without other α-olefins.

The polar portion of the compound comprises a radical with at least one polar bond. This portion, therefore, tends to be compatible with inorganic substances.

Accordingly, the compound is useful in melt blends of such polymer material and solid inorganic material to make them more compatible with each other. Inorganic solid material is material that consists essentially of an inorganic substance that is normally solid at temperatures from well below room temperature to well above the temperatures at which normally solid propylene and ethylene polymers are subjected in melt processing operations such as compounding and article manufacturing. In some embodiments, the material comprises only one inorganic substance. In other embodiments, the material comprises two or more such substances. Examples of an inorganic substance include fillers, extenders, pigments, antacids, and the like.

DETAILED DESCRIPTION OF THE INVENTION

In the more specific aspects of the invention, the generic compound has the general structural formula:

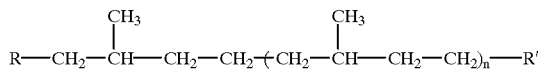

in which R is H or a normal or branched $C_1$–$C_4$ alkyl, n is 2–17, and R' is a radical with at least one polar bond. In most embodiments of the compound, R' is X, COOR'', CN, $NR'''_2$ or $NR'''_2 \cdot HX$ with R'' being R''', $NR'''_2$, $NR'''_2 \cdot HX$ or a monovalent metal cation, R''' being H or a normal or branched $C_1$–$C_4$ alkyl, and X being I, Br, Cl or Fl. In each of $NR'''_2$ or $NR'''_2 \cdot HX$, each R''' can be the same or different. However, in preferred embodiments, R'' is $NHR''' \cdot HX$. Examples of $C_1$–$C_4$ alkyl are methyl, ethyl, n-propyl, isopropyl, n-butyl, sec-butyl and tert-butyl. Examples of a monovalent metal cation include cations of alkali metals of Group 1A of the Periodic Table of the Elements (e.g., Li, Na, K and Rb).

One way to make the generic compound comprises condensing isoprene anionically with a $C_1$–$C_4$ alkyllithium to form an oligomer of 3–18 isoprenoid units with $C_1$–$C_4$ alkyl being a substituent of a methyl carbon of the end isopropyl group of the unsaturated hydrocarbon backbone, and with lithium being anionically attached to the methylene carbon at the other end of the backbone. The oligomer is reacted with either ethylene oxide or carbon dioxide, and then with water, to replace the lithium ion with a hydroxyethyl group or a carboxyl group. In either case the resulting compound is hydrogenated over a Pt or Rh catalyst to saturate the backbone. The saturated, hydroxyethyl substituted compound is halogenated with a hydrogen halide (hydrogen bromide or iodide being preferred because of the ease of reaction) to form a compound of the formula in which R' is X. This halide compound is reacted with (1) an alkali metal cyanide to obtain a compound in which R' is CN, and (2) ammonia (or ammonium hydroxide), or a mono- or di($C_1$–$C_4$alkyl)amine to obtain a compound in which R' is $NR'''_2$. The latter compound is reacted with a hydrogen halide to obtain a compound in which R' is $NR'''_2 HX$. The saturated, carboxyl substituted compound is reacted with (1) a $C_1$–$C_4$ alcohol to form the compound, an ester, in which R'' is $C_1$–$C_4$ alkyl, (2) ammonia (or ammonium hydroxide), or a mono- or di($C_1$–$C_4$alkyl)amine to obtain a compound in which R'' is $NR'''_2$, and (3) an alkali metal base to give a compound in which R'' is a monovalent metal (alkali metal) cation. Similar to the above, the aminocarboxy compound (in which R'' is $NR'''_2$) is reacted with a hydrogen halide to obtain a compound in which R'' is $NR'''_2 HX$. All of the reactions described in this paragraph are conventional type reactions, and the general conditions thereof are well known in the art.

A highly preferred embodiment of the compound, and a precursor of other embodiments of the compound is 3,7,11-trimethyldodecyl halide. A process for making the embodiment starts with 3,7,11-trimethyldodecatriene-1-ol, a naturally occurring isoprenoid known as farnesol. In the process this chemical is catalytically hydrogenated to 3,7,11-trimethyldodecan-1-ol which in turn is halogenated. The resulting halide is reacted as above indicated with respect to the generic halide compound to obtain the various other R' radicals. Thus, the resulting halide is reacted with a $C_1$–$C_4$ alkyl amine to form $C_1$–$C_4$ alkyl (3,7,11-trimethydodecyl) amine. This amine compound then is reacted with a hydrogen halide to form the quaternary compound 3,7,11-trimethyldodecylamine hydrohalide. This quaternary ammonium compound is a preferred compound because of its higher compatibility, more particularly, affinity, compared to the other, non-quaternary ammonium embodiments of the generic compound, with solid inorganic substances.

As above stated, the generic compound is generally compatible with solid inorganic material and with α-olefin polymer material. However, the degree of compatibility with the solid inorganic material varies from one specific embodiment of the compound to another, depending to a large extent on the composition of the inorganic material and the degree of polarity of R'. Similarly, the degree of compatibility with the α-olefin polymer material varies from one specific embodiment of the compound to another, depending to a large extent on the value of n in the formula. Nevertheless, in each case there is significant enhancement of the compatibility of the particles of solid material with the α-olefin polymer material. In addition, the generic compound tends to be in melted condition at the same temperatures at which such polymer material is molten, and this has a favorable effect on compatibility when finely divided particles of solid inorganic material are admixed with the compound and the polymer material in the melted condition. In general, the more compatible a solid inorganic material is with polymer material, the better are the physical properties of the polymer composition containing the solid inorganic material.

3

The best mode now contemplated of carrying out the invention is illustrated by the following examples of the synthesis of preferred specific embodiments of the compound of this invention. The invention is not limited to these examples. All percentages or parts are by weight unless otherwise expressly stated.

EXAMPLE 1

This example illustrates how to make 3,7,11-trimethyldodecyl bromide from farnesol.

A suspension of $PtO_2$ (45.3 mg, 0.2 mmol) in dry hexane (2 ml) is stirred at 20–25° C. under 0.28 MPa (40 psi) of hydrogen for 10 min. It then is admixed with a solution of farnesol (95%, mixture of isomers; 503 mg, 2.27 mmol) in hexane (1 ml). The resulting mixture is stirred at 20–25° C. under 0.62 MPa (90 psi) for 15–16 hrs. The reaction mixture thus obtained is filtered to remove the $PtO_2$, and the filtrate is vacuum distilled to remove the hexane. A typical gas chromatography/mass spectrum analysis of the product that remains reveals full conversion of farnesol to 3,7,11-trimethyldodecan-1-ol (88.9%), 2,6,10-trimethyldodecane (10.2) and some unidentified by-products (0.9%).

To a stirred solution of hydrobromic acid (212g of 48% aqueous solution) in a one liter round bottom flask is added concentrated sulfuric acid (36 ml) at 20–25° C. After about 30 minutes, the above 3,7,11-trimethyldodecan-1-ol product is added dropwise to the flask while continuously stirring the flask contents. The resulting solution is heated to bring it to a gentle boil, and refluxed for about 8 hours. It then is cooled and added to ice cold water (1 liter). The organic layer is separated and washed with cold concentrated sulfuric acid, then a (~2%) dilute aqueous solution of sodium bicarbonate, and finally water. The thus washed reaction product is extracted with hexane. The resulting hexane solution is washed with water, dried over anhydrous magnesium sulfate, and stripped of hexane under 50 mm mercury vacuum. The product thus obtained, as can be confirmed by gas chromatography/mass spectrum analysis, consists essentially of 3,7,11-trimethyldodecyl bromide with the product yield being about 93%.

The bromide product of this example is useful as a compatibilizer of inorganic solid material, and propylene and ethylene polymer material. Furthermore, it is particularly useful as the starting material in the synthesis of $C_1$–$C_4$ alkyl (3,7,11-trimethydodecyl) amines.

EXAMPLE 2

This example illustrates how to make n-butyl (3,7,11-trimethyldodecyl) amine from the bromide product of Example 1.

The Example 1 bromide product is dissolved in toluene (300 ml) in a one liter round bottom flask. While the toluene solution is stirred, n-butyl amine (71 g) is added dropwise. The resulting solution is heated to bring it to a gentle boil, and refluxed for 6 hours. The flask contents are cooled, transferred to a separatory funnel, and shaken with water (500 ml). The aqueous layer is discarded. The organic layer is washed three times with water (500 ml), dried over anhydrous magnesium sulfate, filtered, stripped of toluene at 50 mm of mercury pressure, and vacuum distilled (1 mm of mercury pressure) at 160–165° C. to remove residual toluene. The product thus isolated consists essentially of n-butyl (3,7,11-trimethyldodecyl) amine at typically 99+% purity and 93.2% yield.

4

The n-butyl (3,7,11-trimethyldodecyl) amine product of this example is useful as a compatibilizer of inorganic solid material, and propylene and ethylene material. Furthermore, it is particularly useful as the starting material in the synthesis of n-butyl (3,7,11-trimethyldodecyl) amine hydrohalides.

EXAMPLE 3

This example illustrates the preparation of n-butyl (3,7,11-trimethyldodecyl) amine hydrochloride from the amine product of Example 2.

Amine product of Example 2 (10 g, 35.4 mmol) is dissolved in anhydrous hexane (100 ml) at 20–25° C. Dry hydrogen chloride gas is bubbled slowly through the resulting solution until it is saturated with hydrogen chloride, whereby solid amine hydrochloride precipitates to form a suspension. Dry nitrogen is bubbled through the suspension to remove excess hydrogen chloride. The suspension is filtered. The filtered solid is washed with anhydrous hexane, and subjected to vacuum at 20–25° C. until substantially all of the hexane has evaporated. The solid product thus obtained (typically 11.3 g) consists essentially of n-butyl (3,7,11-rimethyldodecyl) amine hydrochloride.

The n-butyl (3,7,11-trimethyldodecyl) amine hydrochloride product of this example is useful as a compatibilizer of inorganic solid material, and propylene and ethylene polymer material. Because of the close similarity in the hydrocarbon backbone structure of n-butyl (3,7,11-trimethyldodecyl) amine hydrochloride to copolymers of propylene and ethylene, and the affinity of the amine hydrochloride radical to such solid inorganic material, the product is particularly effective as a compatibilizer for such solid material when the sole or predominate component of the polymer material is at least one copolymer of propylene and ethylene.

To use the generic compound of this invention it preferably is in finely divided condition. In such condition it is admixed with propylene and ethylene polymer material and finely divided solid inorganic material. The concentration of the compound in the resulting mixture can vary, but in general it is about 2–25 parts by weight of the mixture. The mixture is melt blended, and the melt blend is processed by conventional ways and means to make shaped articles.

Other features, advantages and embodiments of the invention will be readily apparent to those exercising ordinary skill after reading the disclosures of this specification. In this regard, while specific embodiments of the invention have been described in considerable detail, variations and modifications of these embodiments can be effected without departing from the spirit and scope of the invention as described and claimed.

What is claimed is:

1. A compound having the general structural formula:

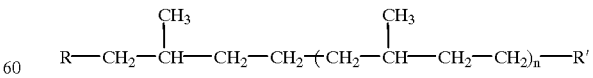

in which R is H, n is 2 or 3, and R' is $NR'''_2 \cdot HX$, wherein R''' is H, the other R''' is n-butyl and X is Cl.

* * * * *